US012661847B2

(12) United States Patent
Maccagnan et al.

(10) Patent No.: US 12,661,847 B2
(45) Date of Patent: Jun. 23, 2026

(54) SYSTEM FOR ADDITIVE MANUFACTURING PROCESSES AND RELATED CONTROL METHOD

(71) Applicant: GIMAC DI MACCAGNAN GIORGIO, Castronno (IT)

(72) Inventors: Simone Maccagnan, Castronno (IT); Giorgio Maccagnan, Castronno (IT); Nicola Pedrocchi, Castronno (IT); Luca Cevasco, Castronno (IT); Paolo Magnoni, Castronno (IT)

(73) Assignee: GIMAC DI MACCAGNAN GIORGIO, Castronno (IT)

( * ) Notice: Subject to any disclaimer, the term of this patent is extended or adjusted under 35 U.S.C. 154(b) by 97 days.

(21) Appl. No.: 16/471,713

(22) PCT Filed: Dec. 13, 2017

(86) PCT No.: PCT/IB2017/057884
§ 371 (c)(1),
(2) Date: Jun. 20, 2019

(87) PCT Pub. No.: WO2018/116075
PCT Pub. Date: Jun. 28, 2018

(65) Prior Publication Data
US 2020/0023575 A1      Jan. 23, 2020

(30) Foreign Application Priority Data

Dec. 20, 2016   (IT) ........................ 102016000128438

(51) Int. Cl.
*B29C 64/118* (2017.01)
*B29C 64/209* (2017.01)
(Continued)

(52) U.S. Cl.
CPC .......... *B29C 64/118* (2017.08); *B29C 64/209* (2017.08); *B29C 64/386* (2017.08);
(Continued)

(58) Field of Classification Search
CPC ... B29C 64/118; B29C 64/386; B29C 64/393; B33Y 50/00; B33Y 50/02
See application file for complete search history.

(56) References Cited

U.S. PATENT DOCUMENTS 9,327,452 B2      5/2016   Mark
10,254,499 B1 *   4/2019   Cohen ...................... B23K 1/19
(Continued)

FOREIGN PATENT DOCUMENTS

WO      WO-2015171352 A1 *  11/2015   ........... B29C 64/106

*Primary Examiner* — Andrew L Swanson
(74) *Attorney, Agent, or Firm* — Stephanie E. Scoggin; James R. Gourley; Carstens, Allen & Gourley, LLP

(57) ABSTRACT

A system for additive manufacturing processes includes an anthropomorphic robot, an extruder mounted on the robot, sensors for detecting a plurality of parameters related to an additive manufacturing process, means for regulating the state of a material extruded from the extruder and a control unit configured to control an extruder path; the control unit is configured to determine the extruder path and/or the deposition strategies of the material according to at least two parameters detected by the sensors.

15 Claims, 3 Drawing Sheets

(51) Int. Cl.

| | | |
|---|---|---|
| *B29C 64/386* | (2017.01) | |
| *B29C 64/393* | (2017.01) | |
| *B33Y 30/00* | (2015.01) | |
| *B33Y 50/02* | (2015.01) | |
| *B33Y 80/00* | (2015.01) | |

(52) U.S. Cl.

CPC ............. *B29C 64/393* (2017.08); *B33Y 30/00* (2014.12); *B33Y 50/02* (2014.12); *B33Y 80/00* (2014.12)

(56) References Cited

U.S. PATENT DOCUMENTS

| | | | | |
|---|---|---|---|---|
| 2014/0252668 A1* | 9/2014 | Austin | ............... | B28B 17/0081 |
| | | | | 425/375 |
| 2014/0328963 A1* | 11/2014 | Mark | ................... | B29C 64/209 |
| | | | | 425/143 |
| 2015/0314528 A1* | 11/2015 | Gordon | ................ | B29C 64/106 |
| | | | | 264/401 |
| 2015/0321418 A1* | 11/2015 | Sterman | ............... | B29C 64/118 |
| | | | | 264/40.7 |
| 2016/0179064 A1* | 6/2016 | Arthur | ................. | B29C 64/393 |
| | | | | 700/98 |
| 2017/0282297 A1* | 10/2017 | Ohno | ..................... | B33Y 30/00 |
| 2018/0065304 A1* | 3/2018 | Stockett | ............... | B29C 64/393 |
| 2018/0117851 A1* | 5/2018 | Reese | .................. | B29C 64/118 |
| 2019/0210286 A1* | 7/2019 | Newell | ................ | B29C 64/241 |

* cited by examiner

Fig.1
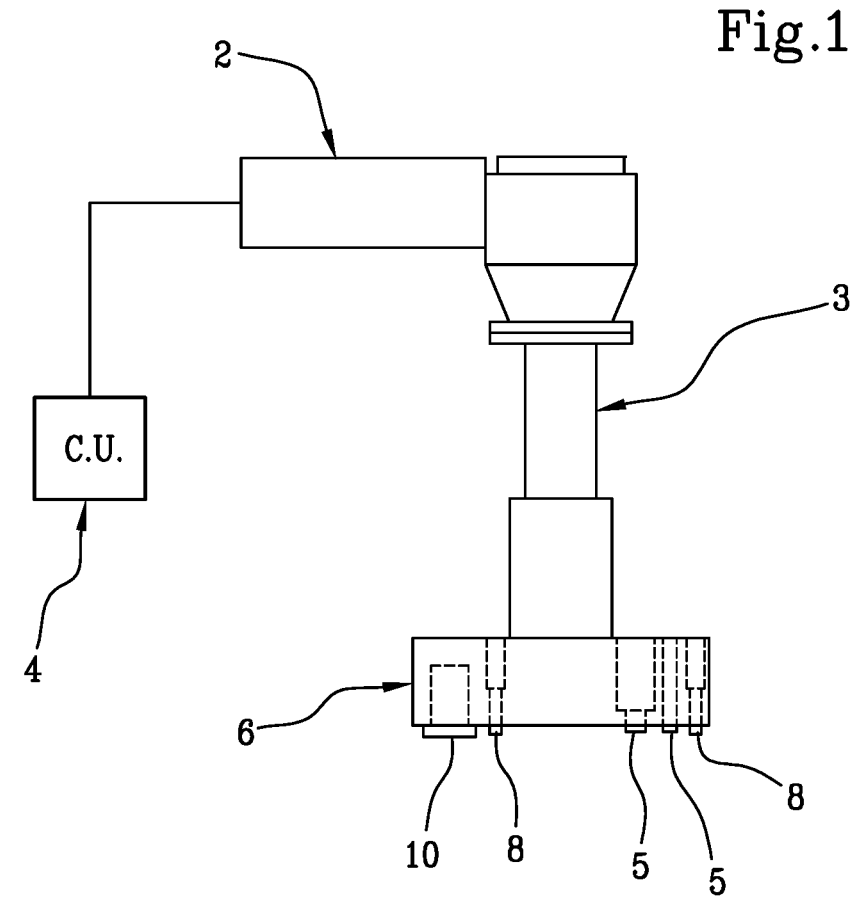
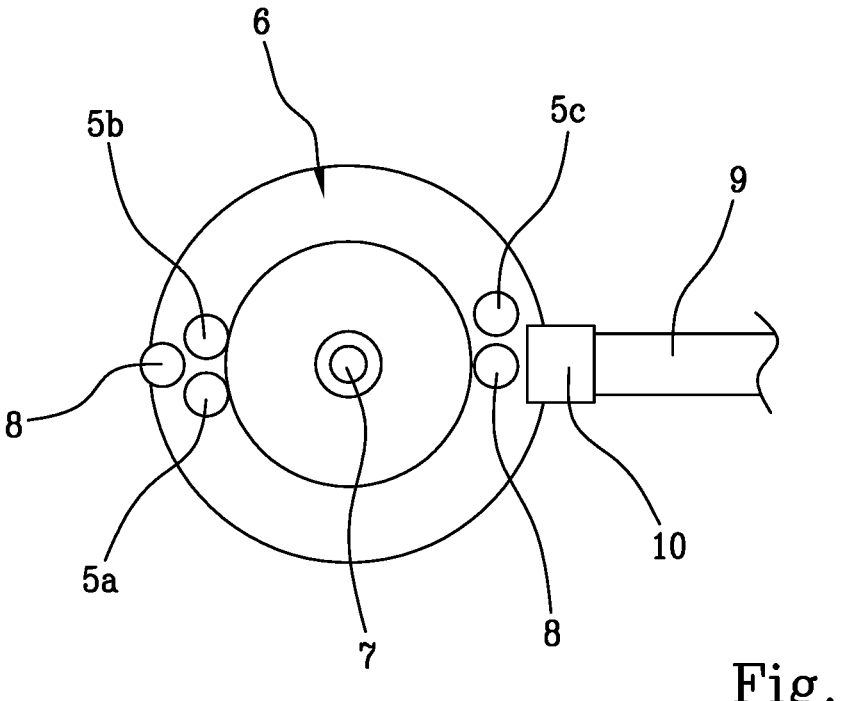
Fig.2

From Fig.3a

SYSTEM FOR ADDITIVE MANUFACTURING PROCESSES AND RELATED CONTROL METHOD

The present invention relates to the field of object realization processes by means of 3D printing.

In particular, the present invention relates to a system for additive manufacturing processes and a related control method.

The additive manufacturing market is rapidly expanding, especially as regards technical polymers, which, however, have the disadvantage of having very different characteristics from each other, in addition, in the case of use of materials with a non-optimal behaviour, or with parameters of use which are not precisely known, it is not easy to obtain a regular extrusion process. For this reason it is essential to have systems for additive manufacturing that are able to operate in a flexible manner, adapting to the specifications of the material that is used, particularly during the extrusion step, so as to ensure the highest quality of the product you want to realise.

This problem becomes particularly evident when considering machines and processes intended for application aimed at large objects and therefore involving high flow rates of material. For this type of processes, long processing times are unavoidably necessary and the need to re-parameterize the system whenever, due to production reasons or other reasons, raw materials are changed. This causes an exponential increase in production times, making this type of processes uncompetitive and inefficient.

In this context, the technical task underlying the present invention is to propose a system for additive manufacturing processes and the related control method that overcomes at least the drawbacks of the prior art mentioned above.

In particular, it is an object of the present invention to provide a system for additive manufacturing processes and related control method able to guarantee an efficient reduction of the processing times regardless of the characteristics of the raw materials used.

The mentioned technical task and the specified objects are substantially achieved by a system for additive manufacturing processes and the related control method comprising the technical features set out in one or more of the appended claims.

According to the present invention, there is provided a system for additive manufacturing processes and related control method which comprises: an anthropomorphic industrial robot; an extruder configured to be mounted on the anthropomorphic industrial robot; a plurality of sensors configured to detect a plurality of parameters related to the operating conditions of an additive manufacturing process; a plurality of state regulation means of a material extruded from said extruder and a control unit configured to control a path of the extruder.

The control unit is also configured to modify the path of the extruder as a function of at least two parameters of the plurality of parameters detected by the plurality of sensors.

Preferably, the plurality of sensors comprise at least one temperature sensor and/or a position sensor.

Preferably the at least one temperature sensor is selected from: infrared, thermal camera, pyrometer, laser sensors.

Preferably the at least one position sensor is selected from: a triangulation laser scanner, laser pointer, confocal sensor, stereoscopy, time-of-flight cameras, capacitive, inductive, photoelectric or ultrasonic sensors and probes with force-sensing resistor sensors.

Preferably, the sensors make measurements on at least one of the following: a cross section, a lower portion and an upper portion of the material that has just been extruded or of a previously extruded layer.

Also preferably, the system comprises a compaction element configured to act on the material exiting the extruder.

Preferably the state regulation means are temperature regulators configured to change the temperature of the extruded material, as a function of at least two parameters of the plurality of parameters detected by the plurality of sensors.

It is also an object of the present invention a control method for additive manufacturing processes which comprises the steps of: acquiring a CAD drawing of an object; performing a slicing step on the CAD drawing acquired in order to generate an extrusion geometry; calculating a path of the extruder which allows to obtain said extrusion geometry; moving an extruder of a system for additive manufacturing processes according to the present invention along the path of the extruder maintaining the correct orientation of the sensors.

The method also comprises a step of modifying the path of the extruder as a function of at least two parameters detected by a plurality of sensors in a system for additive manufacturing processes according to the present invention.

Preferably the method also comprises a step of saving the plurality of parameters detected by the plurality of sensors so as to enable a possible subsequent analysis.

It is also preferably comprised a step of modifying the extrusion geometry, as a function of a comparison between the path of the calculated extruder and the path actually followed.

According to a further aspect, the present invention, relates to a system for additive manufacturing processes and related control method which comprises: an anthropomorphic industrial robot; an extruder configured to be mounted on the anthropomorphic industrial robot; a plurality of sensors configured to detect a plurality of parameters related to the operating conditions of an additive manufacturing process; a plurality of state regulation means of a material extruded from said extruder and a control unit configured to acquire information from at least an area surrounding the material that has just been extruded.

The control unit is also configured to modify the at least one area surrounding the material that has just been extruded as a function of at least two parameters of the plurality of parameters detected by the plurality of sensors.

The plurality of sensors is preferably positioned on a support configured to be mounted on the extruder of the system for additive manufacturing processes. Even more preferably, the support is mounted in the proximity of the nozzle of the extruder.

According to a further aspect, the present invention relates to a control method for additive manufacturing processes which comprises the steps of: acquiring a CAD drawing of an object; performing a slicing step on the CAD drawing acquired in order to generate an extrusion geometry; calculating a path of the extruder which allows to obtain said extrusion geometry and acquiring information from at least an area surrounding the material that has just been extruded.

The method further comprises a step of determining at least one area surrounding the material that has just been extruded as a function of at least two parameters detected by a plurality of sensors of a system for additive manufacturing.

Further characteristics and advantages of the present invention will become more apparent from the description of an exemplary, but not exclusive, and therefore non-limiting preferred embodiment of a system for additive manufacturing processes e the related control method, as illustrated in the appended drawings, wherein:

FIG. 1 shows the system for additive manufacturing processes according to a possible embodiment;

FIG. 2 shows a detail of the area surrounding a nozzle of an extruder included in a system for additive manufacturing processes according to a possible embodiment;

Figure 3A:
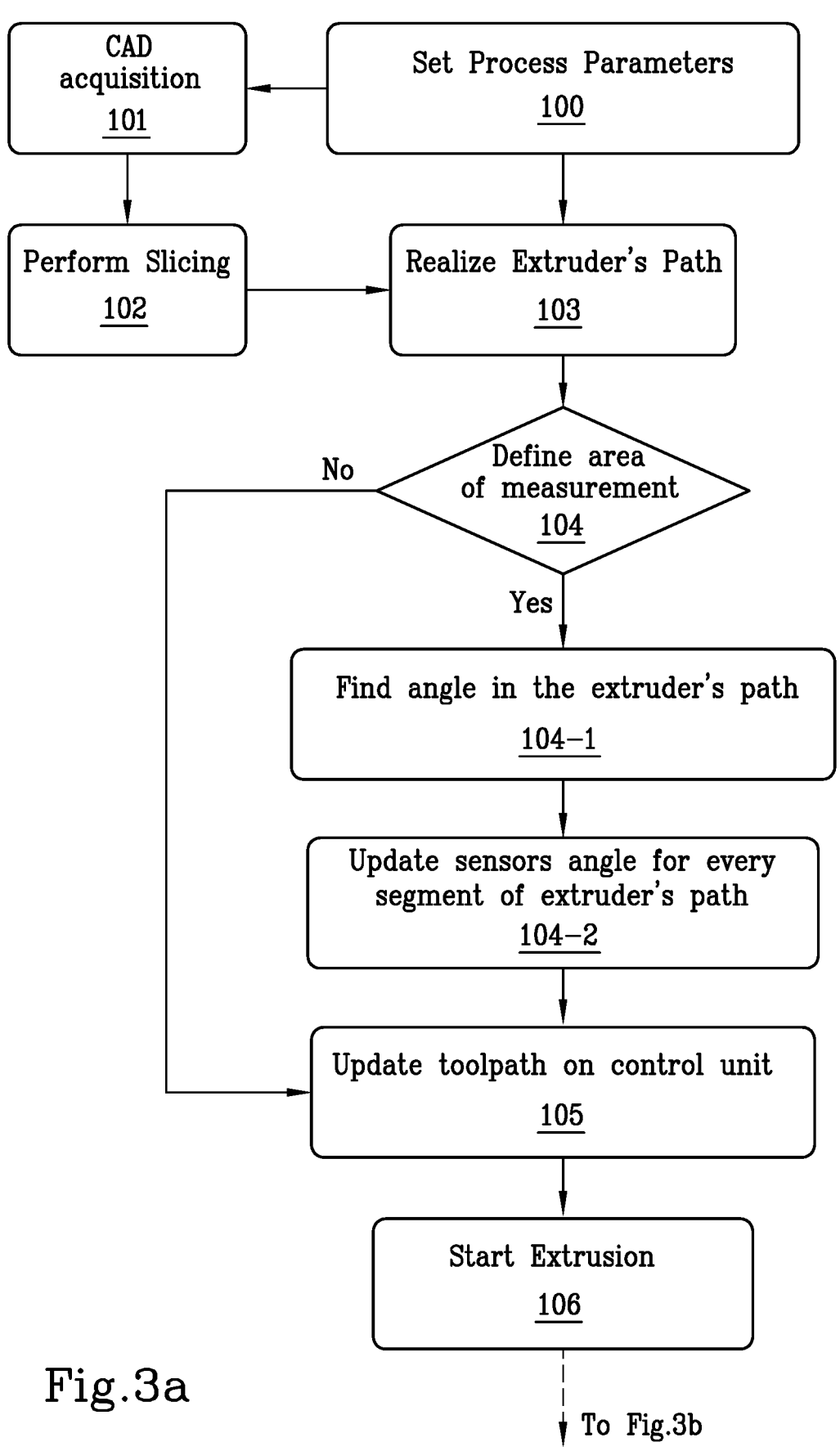
FIG. 3 shows the detailed block diagram of the steps included in the method of the present invention according to a possible embodiment.

In FIG. 1, number 1 indicates a system for additive manufacturing processes.

The system 1 comprises an anthropomorphic industrial robot 2 (indicated only schematically in the appended figures) and an extruder 3. The extruder 3 is configured to be mounted on the robot 2 so as to allow its movement in a practical and efficient manner.

The path along which the extruder moves is controlled by a control unit 4, which further deals with managing also other parameters of an additive manufacturing process, such as, e.g., the extrusion speed and the flow rate of the extruded material.

The control unit 4 is also configured to acquire information from at least one surrounding area of a material 9 that has just been extruded and to determine the dimensional features of the surrounding area as a function of at least two parameters of the plurality of parameters detected by said plurality of sensors 5.

The system 1 further comprises the plurality of sensors 5 which, according to a possible embodiment shown in the attached figures, can be mounted on a support 6 which allows the sensors 5 to be moved in an area surrounding a nozzle 7 of the extruder 3, in this way, it is possible to position the sensors in such a way that they are always in the optimal position during the execution of the additive manufacturing process and that, e.g., their line of sight is not obstructed by the movements of the extruder 3.

Always according to a possible embodiment, the support 6 is configured to be mounted on the extruder itself, in the proximity of the nozzle 7. For example, as shown in FIG. 2, the support 6 could have a ring shape and be concentrically mounted to the extruder 3, so that the nozzle 7 is positioned in the centre of the ring, in this way the sensors 5 are free to move by rotating around the nozzle 7 during the additive manufacturing process, allowing the process itself to be monitored without the risk that one of the structural elements of the extruder obstructs the view.

This structural characteristic may also be independent of the other characteristics described and claimed herein.

Alternatively, the plurality of sensors 5 could be statically positioned in an area surrounding the extruder while the correct acquisition of the operating parameters throughout the additive manufacturing process would be ensured by a plurality of focusing means configured to correctly and optimally direct the visual field of the sensors towards the area from which you intend to collect information.

According to a possible embodiment, shown in FIG. 2, there are three sensors 5. In particular, there is a temperature sensor 5a, a position sensor 5b and a further sensor 5c which can be either a further temperature sensor or a further position sensor.

The temperature sensor 5a can be kept in front of the nozzle, with respect to the advancement direction of the extruder 5, to understand whether the layer below the one being extruded is at a temperature suitable for welding the two, but also behind it, always with respect to the advancement direction of the extruder 5, in order to monitor the cooling and therefore the solidification of the material that has just been deposited.

The position sensor 5b can be kept in front of the nozzle, with respect to the advancement direction of the extruder 5, in the case of layer-on-layer depositions, so as to detect and correct dimensional irregularities of the underlying layer on which the current layer is being deposited. It acquires meaning also mounted behind the nozzle, always with respect to the advancement direction of the extruder 5 to monitor the actual extrusion geometry realised, during its solidification.

Examples of temperature sensors that can be used are: infrared sensors, which measure infrared irradiated by objects in their visual field; thermal cameras, able to obtain temperature maps of the exposed surfaces; pyrometers, which determine the temperature based on the thermal spectrum emitted by the body to be measured; laser thermometers that determine the temperature of a body from its black-body radiation.

Examples of position sensors that can be used are: triangulation laser scanners, consisting of a transmission unit that emits a laser beam towards the object at an angle that is incrementally varied and of which the value is instantly known, and a receiving unit consisting of a CCD sensor positioned at the opposite end of the instrument with respect to the laser emitter (in this type of technology the emitter-receiver distance is known beforehand and represents the base of the "object-emitter-receiver" triangle, so that the position of the point on the reflecting surface is determined by trigonometrically solving this triangle); laser pointers, which exploit the step difference of the wave reflected by the object to be measured; confocal sensors, which allow the reconstruction of three-dimensional structures collecting a series of images on different sections of a three-dimensional object; stereoscopy, which reconstructs a three-dimensional image from two-dimensional images; time-of-flight cameras, which measure the time it takes for a light pulse to travel the camera-object-camera route and, unlike laser scanners, are able to analyse all their visual field at the same time; capacitive sensors, inductive, photoelectric or ultrasonic sensors, probes with force-sensing resistor sensors to evaluate the contact presence and its entity.

The sensors 5 can be configured to collect information from specific areas of the material 9, e.g., it is possible to make measurements on: a cross section, a lower portion or an upper portion of the material 9 that has just been extruded, in the event that the sensors 5 are positioned behind the nozzle 7, or on the corresponding portion of a previously deposited layer in the event that the sensors 5 are positioned frontally with respect to the nozzle 7.

It is also possible to collect information from different areas of the extruded material 9 for different sensors 5, in this way it is possible to acquire a greater number of parameters allowing to obtain more information on the process.

The system 1 further comprises a plurality of state regulation means 8, in FIG. 2 attached, the state regulation means are thermoregulation means, mounted in the proximity of the nozzle 7 of the extruder 3.

The state regulation means 8 allow to modify the state characteristics of the material 9 exiting the nozzle 7 such as, e.g.: temperature, viscosity and density. In the case described here, the state regulation means are thermoregulation means which act on the material 9 by heating or cooling it in the event that it is not at a temperature suitable for a correct welding with a previous layer.

The thermoregulation means can also act on a layer already deposited so as to make it more suitable to weld with the material being extruded.

Examples of possible state regulation means 8 which can be used in the present system are: tubes of air blown through suitable nozzles adjustable in terms of flow rate; local resistances; Peltier cells; laser; reagent distillers able to cause endothermic or exothermic reactions in the extruded material 9.

In FIG. 2 a compactor 10 is also shown, configured to act on the material exiting the extruder. In particular, the compactor element 10 acts on the material 9 to regularize the layer of material 9 that has just been extruded and to check its conformation.

According to a preferred embodiment, the compactor 10 is a mechanical compactor, such as a shaping shoe.

A further innovative and original structural characteristic of the present invention can conveniently be given by the presence, in the hardware system described hitherto and claimed below, of suitable closed loop measurement and/or control means of mechanical properties of the material 9 that has just been extruded: such closed loop measurement and/or control means can, e.g., be suitable to detect (or control, by means of structural elements and/or feedback functional schemes which can be implemented by known methodologies) a cooling gradient and/or one or more chemical/physical parameters related to crystallization processes of the material (9) that has just been extruded.

From the point of view of the system structural elements required to perform such a closed loop control, and always referring to the possibility of implementing feedback controls, it is possible to mention closed loop measurement and/or control means comprising Raman-effect and/or "FTIR"-type spectroscopic sensors.

Figure 3B:
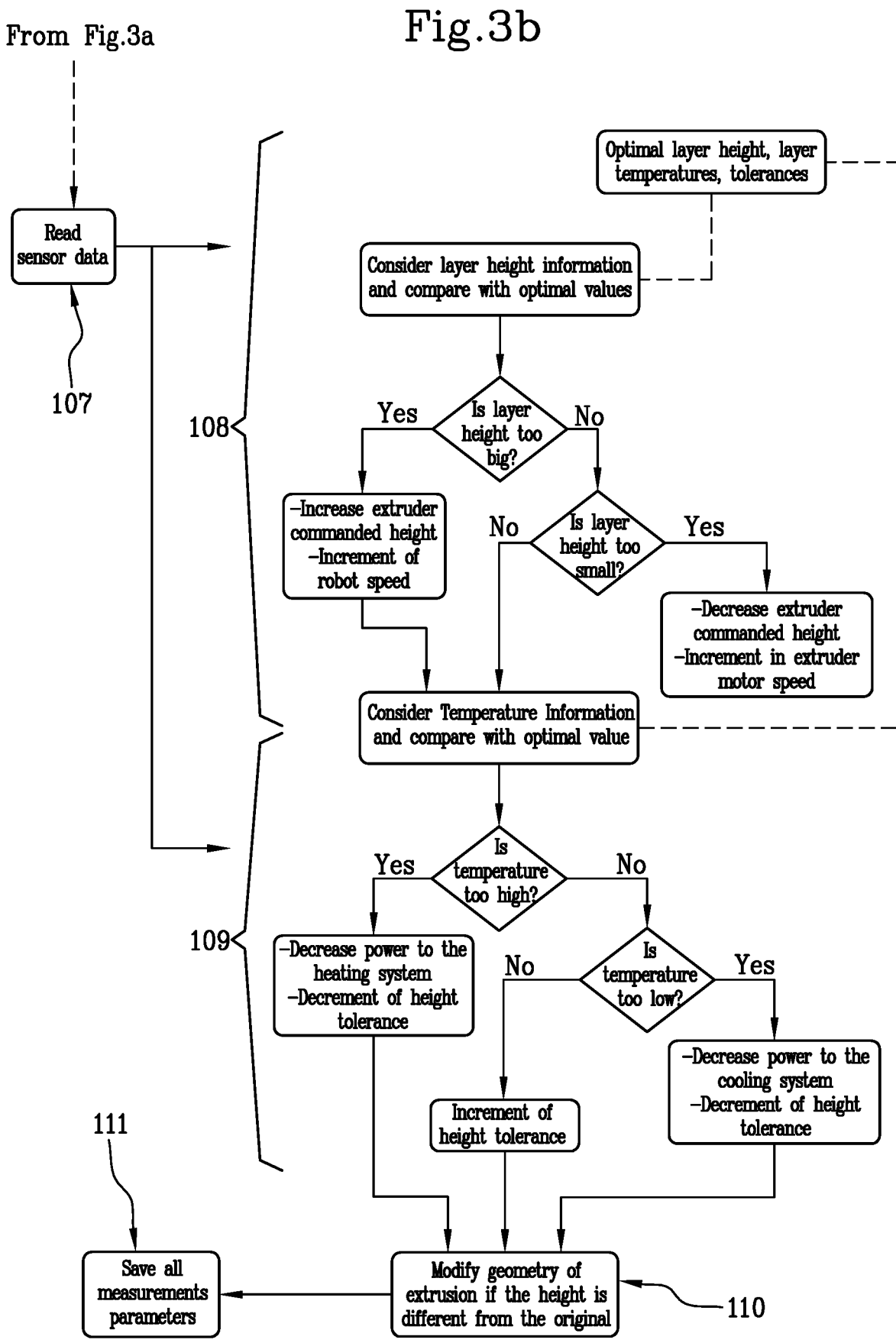

In FIG. 3 is instead shown the flow diagram of the control method steps for additive manufacturing processes according to the present invention.

The method begins with a step 100 of setting a series of process parameters, such as, e.g.: deposition area, height and thickness of the layers to be deposited.

This is followed by a step of acquisition by the system 1 of a CAD model 101 in which the object to be realised is represented.

The drawing is then subjected to a slicing step 102, wherein the 3D model is converted into instructions that serve to drive the system for additive manufacturing, in practice the model of the object is cut into horizontal layers, generating an extrusion geometry presenting the classic steps that distinguish the objects made via this type of process.

Subsequently, on the basis of the information obtained from the slicing step 102, a path of the extruder 103 is calculated, which the extruder 4 must follow in order to realise the object, the image of which has been acquired.

Starting from the extruder path, it is possible to define, step shown in FIG. 3 with the number 104, at least one area, surrounding the extrusion area, from which the collection of the information via the sensors 5 can be made.

Sub-steps 104-1 and 104-2 are also provided, in which the angles are calculated between successive segments of the path of the extruder 3 and rotations are imposed on the visual field of the sensors 5 corresponding to such angles. In this way it is ensured that the sensors 5 maintain their optimal view with respect to the at least one area from which information is to be collected in every moment of the process.

Once the necessary information has been loaded on the control unit 4 it is possible to start the extrusion 106 by moving the extruder 3 along the path of the extruder previously calculated.

At each point of the extruder path the output of the sensors 107 will be read and, if necessary, the extruder path will be modified according to the values measured, in particular two sub-steps are provided:

a first sub-step 108 in which once the output of the temperature sensors 5a has been read, it is possible to compare it with the ideal temperature for which the material 9 is in a softened state (but before the glass transition): this is the best condition to create welding between successive layers of material 9.

Such condition can be achieved by means of a state regulation means 8, in particular a thermoregulation means, which allows to regulate the temperature of the material 9 based on the difference between the measured temperature of the underlying layer and the ideal one for creating an adequate welding. On the basis of the temperature information it is also possible to regulate the power to be given to another thermoregulation means, the task of which is to make the material as solid (and as soon) as possible downstream from the deposition.

a second sub-step 109 in which, once the output of the position sensor 5b has been read, the information on the height of the previously deposited layer is extracted: according to the extracted/derived/calculated result in this sub-step, a layer of material may be characterized by a greater or lesser height with respect to that provided by the slicing step 102.

In particular if the height of the previously deposited layer was too small, the extruder 3 could be too high, causing the material 9 to fall without allowing the compactor element 10 to exert any compression, with negative effects on the quality of the welding between the layers of material 9, if not even obtaining an irregular deposition with heavy dimensional distortion.

If the height of the underlying layer is excessive, the extruder 3 could be too low, compressing the material 9 excessively or being immersed in the material 9 itself: in this case, the material 9 would accumulate excessively with heavy dimensional distortions and negative effects on solidification. The ideal height would be that for which the underlying material 9 is compressed slightly, deforming itself regularly in width. Consequently, once an ideal compression and a tolerance level have been defined, the output of the position sensor 5b is used to adjust the height of the extruder 3 and thus obtain the ideal compression. In conjunction with the height change it is also possible to make the following corrections in deposition of the next layer: in case of a too high layer it is possible to avoid material accumulation by slightly increasing the advancement speed, while in case of a too low layer it is possible to increase the flow rate of the material 9 which is extruded.

The algorithm also provides for crossing the temperature and position information: if it is found that the material is at a good temperature to have a correct welding between the layers, then a higher tolerance can be adopted on the height corresponding to an ideal compression between the layers. Otherwise, if there is not a suitable temperature, it is possible to impose a lower tolerance on the compression between the layers.

The method can further comprise a step of determining the at least one area surrounding the material 9 that has just been extruded as a function of at least two parameters detected by a plurality of sensors 5. In this way it is possible to ensure that the point of view of the sensors 5 is always in an optimal position with respect to the area from which information is to be collected, also regardless of any modifications that are made to the extruder path according to the needs occurring during the execution of the additive manufacturing process.

Moreover, since the height of each single layer is adjusted during extrusion step 106, in order to have a good welding between layers and avoid distortions in the plane, it may happen that, following the path of the original extruder, total final heights, different from those previously calculated, are undesirably obtained. To take into account this difference, the method comprises a step, indicated by 110 in the flow diagram, which provides for modifying the extrusion geometry in the event that the height adjustment has led to substantial differences with respect to the height present in the original CAD.

Steps 107 to 110 are repeated throughout the duration of the additive manufacturing process.

Thanks to the possible presence of the appropriate hardware elements mentioned earlier in this description, it is possible that the method implemented by the invention comprise a closed loop measurement and/or control step of mechanical properties of the material 9 that has just been extruded: advantageously, such closed loop measurement and/or control step comprises in turn a sub-step to detect and/or control a cooling gradient and/or one or more chemical/physical parameters related to crystallization processes of the material 9 that has just been extruded (and such parameters can then be used as computation factors to send a feedback signal on the remaining system hardware, which in this way can control the thermal or mechanical or fluid-dynamic deposition conditions of the material 9 itself to take into account its crystallization dynamics).

At the end of the process the method further provides for a saving step 111 of all the parameters detected by the sensors 5 so as to allow a possible subsequent analysis.

Advantageously, the present method allows to obtain better interconnection properties between the deposited layers, not disjoint by a considerable reduction of the working times (especially in the case of manufactured articles with rather large dimensions/volumes, the present invention is able to produce a three-dimensional manufactured articles with a volume of approximately 1 cubic meter over a period of time between 2.5 and 4 hours).

It is also possible to obtain better dimensional properties thanks to the real-time measurement and the feedback on the extruder 3 which deposits, according to an extrusion geometry obtained from a CAD drawing, real dimensions of the extruded material 9 and the point where the nozzle 7 of the extruder 3 is located.

The precise control on the temperature of the material 9 also allows to optimize the microstructural properties of the material 9 used for the additive manufacturing process, ensuring a control of its mechanical properties.

The invention claimed is:

1. A system for additive manufacturing processes, comprising:
a robot, the robot being an anthropomorphic industrial type of robot;
an extruder configured to be mounted on said robot;
a first temperature sensor and a first position sensor, said first temperature sensor configured to measure temperature of extruded material, and said first position sensor configured to measure dimensional properties of extruded material;

a plurality of regulators of a material extruded from said extruder;
a control unit configured to control a path of the extruder and to determine the path of the extruder based on measurements by said first temperature sensor and by said first position sensor;
wherein:
the control unit comprises measurement and/or control means in a closed loop for measuring and/or controlling the mechanical properties of the material that has just been extruded and is configured to acquire information from at least one area surrounding the material that has just been extruded, the control unit being also configured to determine the at least one surrounding area based on a temperature and a dimensional property measured by said first temperature sensor and by said first position sensor; and
wherein the control unit is configured to, during extrusion, adjust:
height of the extruder to obtain a compression between layers of said material extruded from said extruder based on the measured dimensional property of the first position sensor,
tolerance of said compression on a height corresponding to an ideal compression between the layers based on a suitable temperature detected by the temperature sensor,
advancement speed of said extruder on a height corresponding to an ideal compression between the layers based on a suitable temperature detected by the first temperature sensor, and
a flow rate of the material which is extruded on a height corresponding to an ideal compression between the layers based on a suitable temperature detected by the first temperature sensor; and
wherein said first temperature sensor is at least one of the following: an infrared sensor, a thermal camera, a pyrometer and a laser sensor.

2. The system according to claim 1, wherein the first temperature sensor takes a temperature measurement on at least one of the following: a cross section, a lower portion and an upper portion of the material exiting the extruder.

3. The system according to claim 1, wherein said first position sensor is at least one of the following:
a triangulation laser scanner, laser pointer, confocal sensor, stereoscopy, time-of-flight cameras, capacitive, inductive, photoelectric or ultrasonic sensors and probes with force-sensing resistor sensors.

4. The system according to claim 1, wherein said first position sensor takes a dimensional measurement on at least one of the following: a cross section, a lower portion and an upper portion of the material exiting the extruder.

5. The system according to one claim 1, wherein the system for additive manufacturing processes comprises a compaction element configured to act upon the material exiting the extruder.

6. The system according to claim 1, wherein said regulators are temperature regulators configured to change the temperature of the material that has just been extruded, based on a position and a temperature respectively detected by said first temperature sensor and by said first position sensor.

7. The system according to claim 1, wherein the first position sensor and the first temperature sensor are positioned on a support configured to be mounted on the extruder of the system for additive manufacturing processes.

8. The system according to claim 7, wherein said support is mounted in the proximity of the nozzle of the extruder.

9. The system according to claim 1, wherein said measurement and/or control means in a closed loop are also suitable for detecting and/or controlling a cooling gradient and/or at least one chemical or physical parameter correlated with a crystallization processes of the material that has just been extruded.

10. The system according to claim 9, wherein said measurement and/or control means in a closed loop comprise a Raman-effect sensor and/or an "FTIR"-type spectroscopic sensor.

11. The system of claim 1, wherein the extruder comprises a nozzle configured to extrude the material being extruded, wherein the system is configured so the first temperature sensor is in front of the nozzle with respect to an advancement direction of the extruder, and wherein the system is configured to use the first temperature sensor to determine whether the temperature of said material that has already been deposited is within a desired temperature range.

12. The system of claim 11, wherein it further comprises a second temperature sensor, and wherein the system is configured so that the second temperature sensor is behind the nozzle with respect to an advancement direction of the extruder, and wherein the system is configured to use the second temperature sensor to determine whether the temperature of the material being extruded is within a desired temperature range.

13. The system of claim 1, wherein the extruder comprises a nozzle configured to extrude the material being extruded, wherein the system is configured so that the first position sensor is in front of the nozzle with respect to an advancement direction of the extruder and so that the first position sensor is configured to detect dimensions of said material that has already been deposited.

14. The system of claim 13, wherein it further comprises a second position sensor, and wherein the system is configured so that the second position sensor is behind the nozzle with respect to an advancement direction of the extruder and so that the second sensor is configured to monitor an extrusion geometry of the material being extruded onto said material that has already been deposited.

15. A system for additive manufacturing processes, comprising:

a robot, the robot being an anthropomorphic industrial type of robot;

an extruder configured to be mounted on said robot;

a first temperature sensor and a first position sensor, said first temperature sensor configured to measure temperature of extruded material, and said first position sensor configured to measure dimensional properties of extruded material;

a plurality of regulators of a material extruded from said extruder;

a control unit configured to control a path of the extruder and to determine the path of the extruder based on measurements by said first temperature sensor and by said first position sensor;

wherein:

the control unit comprises measurement and/or control means in a closed loop for measuring and/or controlling the mechanical properties of the material that has just been extruded and is configured to acquire information from at least one area surrounding the material that has just been extruded, the control unit being also configured to determine the at least one surrounding area based on a temperature and a dimensional property measured by said first temperature sensor and by said first position sensor; and wherein the control unit is configured to, during extrusion, adjust:

height of the extruder to obtain a compression between layers of said material extruded from said extruder based on the measured dimensional property of the first position sensor, tolerance of said compression on a height corresponding to an ideal compression between the layers based on a suitable temperature detected by the first temperature sensor;

wherein said first temperature sensor is at least one of the following: an infrared sensor, a thermal camera, a pyrometer and a laser sensor, said first temperature sensor taking a temperature measurement on at least one of the following: a cross section, a lower portion and an upper portion of the material exiting the extruder; and wherein said first position sensor is at least one of the following: a triangulation laser scanner, laser pointer, confocal sensor, stereoscopy, time-of-flight cameras, capacitive, inductive, photoelectric or ultrasonic sensors and probes with force-sensing resistor sensors, said first position sensor taking a dimensional measurement on at least one of the following: a cross section, a lower portion and an upper portion of the material exiting the extruder.

\* \* \* \* \*